United States Patent [19]

Bernard

[11] Patent Number: 5,422,195
[45] Date of Patent: Jun. 6, 1995

[54] CARBONATE FUEL CELL WITH DIRECT RECYCLE OF ANODE EXHAUST TO CATHODE

[75] Inventor: Randolph M. Bernard, New Preston, Conn.

[73] Assignee: Energy Research Corporation, Danbury, Conn.

[21] Appl. No.: 237,675

[22] Filed: May 4, 1994

[51] Int. Cl.[6] .................................................. H01M 8/06
[52] U.S. Cl. ........................................ 429/17; 492/20; 492/26; 492/19
[58] Field of Search ............... 429/17, 16, 19, 13, 429/20, 26, 34, 38, 39

[56] References Cited

U.S. PATENT DOCUMENTS

| | | | |
|---|---|---|---|
| 3,477,942 | 11/1969 | Cochran | 208/10 |
| 4,041,210 | 8/1977 | Van Dine | 429/16 |
| 4,128,700 | 12/1978 | Sederquist | 429/17 |
| 4,304,823 | 12/1981 | Lemelson | 429/19 |
| 4,532,192 | 7/1985 | Baker et al. | 429/19 |
| 4,622,275 | 11/1986 | Noguchi et al. | 429/19 |
| 4,657,828 | 4/1987 | Tajima et al. | 429/12 |
| 4,738,903 | 4/1988 | Garow et al. | 429/17 |
| 4,791,033 | 12/1988 | Patel | 429/19 |
| 4,865,926 | 9/1989 | Levy et al. | 429/20 |
| 4,921,765 | 5/1990 | Gmiendl et al. | 429/16 |
| 4,943,493 | 7/1990 | Vartanian | 429/17 |
| 5,084,362 | 1/1992 | Farooque | 429/19 |
| 5,232,793 | 8/1993 | Miyauchi et al. | 429/16 |

OTHER PUBLICATIONS

NASA (Contract. Rep.) NASA-CR-173104 10 Jul. 1983, Connecticut United Technologies Corp.: The Study of Integrated Coal-Gasifier Molten Carbonate Fuel Systems-Contract Nr. 956389, pp. 1-1 to 8-1.
Int. J. Hydrogen Energy, vol. 11, No. 3, pp. 161-167, 1986, "The Coal Gasification Fuel Cell System for Efficient and Environmentally Acceptable Power Production From Coal", P. Pietrogrande, et al.

*Primary Examiner*—Anthony Skapars
*Attorney, Agent, or Firm*—Robin, Blecker, Daley & Driscoll

[57] ABSTRACT

A fuel cell system and method in which fuel exhaust gas from the anode compartment of a fuel cell is communicated by the anode compartment directly to the cathode compartment of the fuel cell, thereby causing burning of the fuel exhaust gas and oxidant gas delivered to the cathode compartment to generate $CO_2$.

28 Claims, 4 Drawing Sheets

CARBONATE FUEL CELL WITH DIRECT RECYCLE OF ANODE EXHAUST TO CATHODE

BACKGROUND OF THE INVENTION

This invention relates to fuel cells and, in particular, to fuel cells having carbonate as the electrolyte.

In carbonate fuel cells of conventional design, carbonaceous fuel is provided to the fuel cell anode compartment for the required anode reaction. At the cathode compartment, oxidant or air and carbon dioxide are supplied for the cathode reaction.

The carbon dioxide supplied to the cathode compartment is typically generated from the anode exhaust which includes steam, carbon dioxide carbon monoxide and hydrogen. Conventionally, this exhaust is coupled to a burner where the hydrogen and carbon monoxide is combusted with the air to generate carbon dioxide. The resultant carbon dioxide and other components of the combusted products are then coupled to the inlet manifold of the cathode compartment.

This technique of generating and recirculating carbon dioxide to the cathode compartment of the fuel cell results in an efficient fuel cell power plant. However, there is a significant cost associated with the external burner and with the high temperature stainless steel piping required to recycle the resultant combusted gases. This has prompted researchers to consider proposals which increase the efficiency of the process and/or reduce the piping required.

One proposal involves increasing the burner efficiency by utilizing a catalytic burner. A second proposal also utilizes a catalytic burner, but contemplates placing the burner within the cathode inlet manifold. While these proposals offer certain improvements, the first proposal still requires that expensive piping be used for the combusted gases. The second proposal, while reducing the piping, does so at the expense of increasing the complexity of the cathode inlet manifold.

It is therefore a primary object of the present invention to provide a carbonate fuel cell and method with improved generation and delivery of carbon dioxide gases to the cathode compartment of the fuel cell.

It is a further object of the present invention to provide a carbonate fuel cell and method in which carbon dioxide from the anode exhaust gas is generated and supplied to the cathode compartment of the fuel cell without a burner external of the fuel cell and without external piping.

SUMMARY OF THE INVENTION

In accordance with the principles of the present invention, the above and other objectives are realized in a fuel cell system of the above-type in which the anode compartment of the fuel cell is adapted to directly couple fuel exhaust gas to the cathode compartment of the fuel cell so that the fuel exhaust gas is burned in the cathode compartment with the oxidant gas supplied to the compartment. By directly introducing and burning the fuel exhaust gas and oxidant gas in the cathode compartment, the need for a separate burner and separate piping is eliminated in a way which does not overcomplicate the cathode compartment of the fuel cell system.

In the fuel cell system to be disclosed hereinafter, the anode passages of the anode compartment of the fuel cell are constructed so as to define restricted anode outlet ports and so as to situate these outlet ports at the inlet manifold of the cathode compartment. The fuel exhaust gas is thus delivered at a desired pressure from the anode outlet ports directly into the cathode inlet manifold where it mixes with the oxidant gas. The mixture of fuel exhaust gas and oxidant gas causes the fuel exhaust gas to burn as the gases pass into and through the cathode compartment. This, in turn, results in the generation of the desired carbon dioxide gas in the cathode passages. To facilitate placement of the anode outlet ports at the cathode inlet manifold, the anode passages run in the direction of cathode passages so as to allow countercurrent flow of the oxidant and fuel gases therethrough. Additionally, this configuration results in uniform delivery of fuel exhaust gases to the cathode compartment.

In a further aspect of the invention, means is provided to cause heating of the oxidant gas supplied to the cathode inlet manifold. This means is in the form of a cathode gas recycle loop which recycles cathode exhaust gas to the cathode inlet manifold.

In yet a further aspect of the present invention, a fuel cell system comprises an anode compartment and a cathode compartment having a cathode inlet manifold exclusive of any burner means and further means is provided for coupling fuel exhaust gas from the anode compartment to the cathode inlet manifold of the cathode compartment for burning with the oxidant gas supplied to the cathode compartment.

DESCRIPTION OF THE DRAWINGS

The above and other features and aspects of the present invention will become more apparent upon reading the following detailed description in conjunction with the accompanying drawings, which.

DETAILED DESCRIPTION

Figure 1:
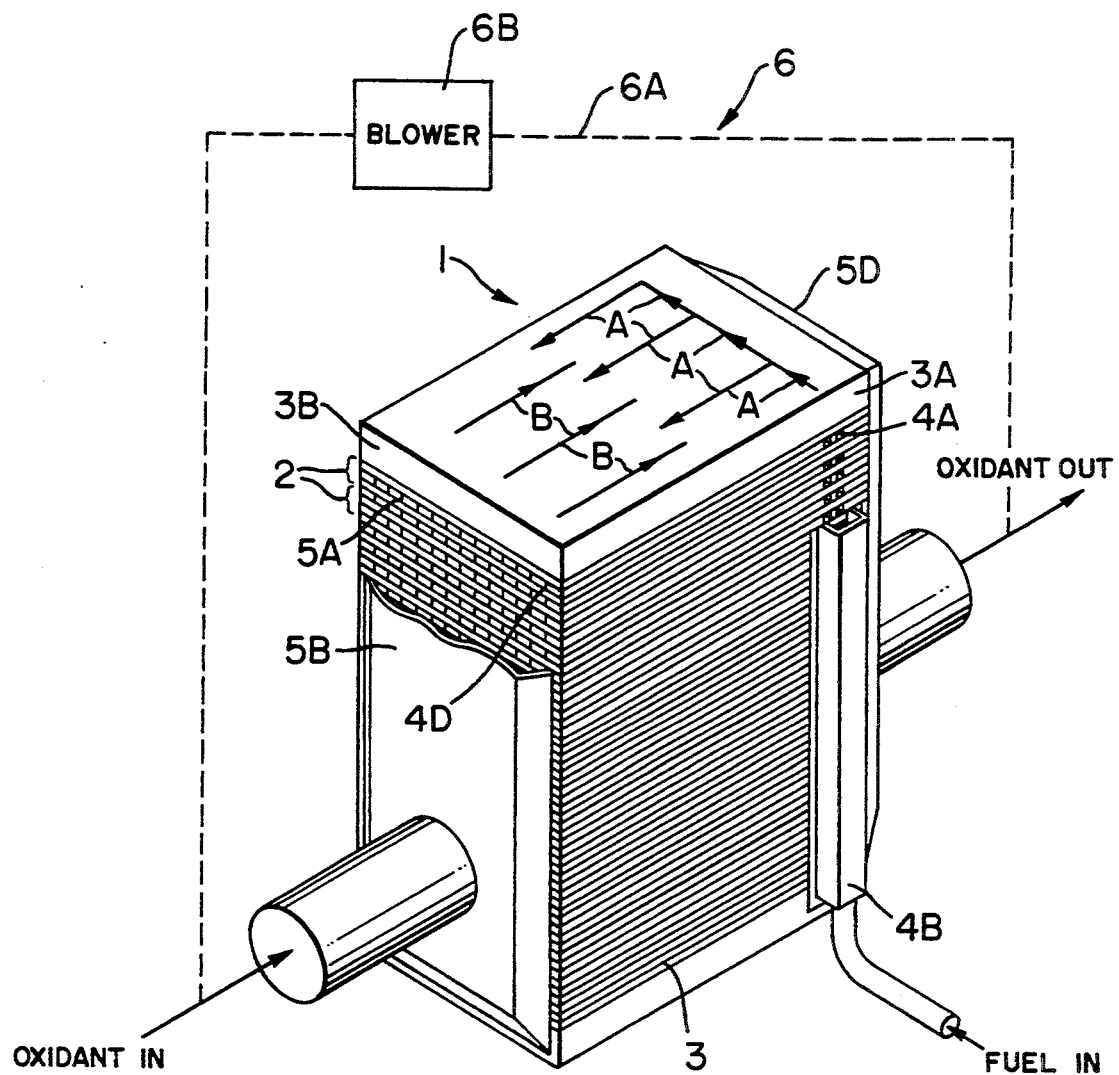
FIG. 1 illustrates a fuel cell system in accordance with the principles or the present invention.

FIG. 1 illustrates a fuel cell system 1 in accordance with the principles of the present invention. The system 1 comprises a plurality of fuel cells 2 arranged one on top of the other to form a stack 3.

The fuel cells 2 are configured, as discussed in more detail below, to define on one end face 3A of the stack 3, anode inlet ports 4A which communicate with an anode inlet manifold 4B. The anode inlet ports 4A carry fuel gas from the anode inlet manifold 4B to anode passages 4C (not visible in FIG. 1) defined by the fuel cells 2. The anode passages 4C, in turn, carry the fuel gas through the stack 3 in a direction depicted by the arrows A.

The fuel cells 2 are further configured, as also discussed in more detail below, to include, on a second end face 3B of the stack, cathode inlet ports 5A which communicate with a cathode inlet manifold 5B. The cathode inlet ports 5A also communicate with cathode passages 5C (not visible in FIG. 1) defined by the fuel cells 2. The passages 5C, in turn, carry oxidant gas through the stack 3 in a direction depicted by the arrows B. Resultant oxidant exhaust gas then exits the stack via cathode exhaust manifold 5D.

In accordance with the invention, the fuel cells 2 are additionally configured such that the anode passages 4C terminate at anode outlet ports 4D which directly feed the cathode inlet manifold 5B. The fuel exhaust gas is thus delivered directly from the outlet ports 4D to the oxidant inlet manifold 5B where the anode exhaust gases mix with the input oxidant gas which is also being delivered to this manifold. As a result, a combination of fuel exhaust gas and oxidant gas is fed by the cathode manifold 5B and the cathode inlet ports 5A into the cathode passages 5C.

In this way, the fuel exhaust gas is burned by the oxidant gas in the cathode passages 5C to generate $CO_2$ gas, as needed to promote electrochemical reaction within the fuel cells 2. Because of the direct entry of the fuel exhaust gas into the cathode inlet manifold 5B, via the anode outlet ports 4D in direct communication therewith, no anode exhaust gas manifold, external piping or burner are required in the fuel cell system 1 to generate the needed $CO_2$ gas. Moreover, the burning of the fuel exhaust gas occurs without any need for a separate catalytic burner in the cathode inlet manifold. All these factors greatly reduce the cost of the system 1.

Figure 2:
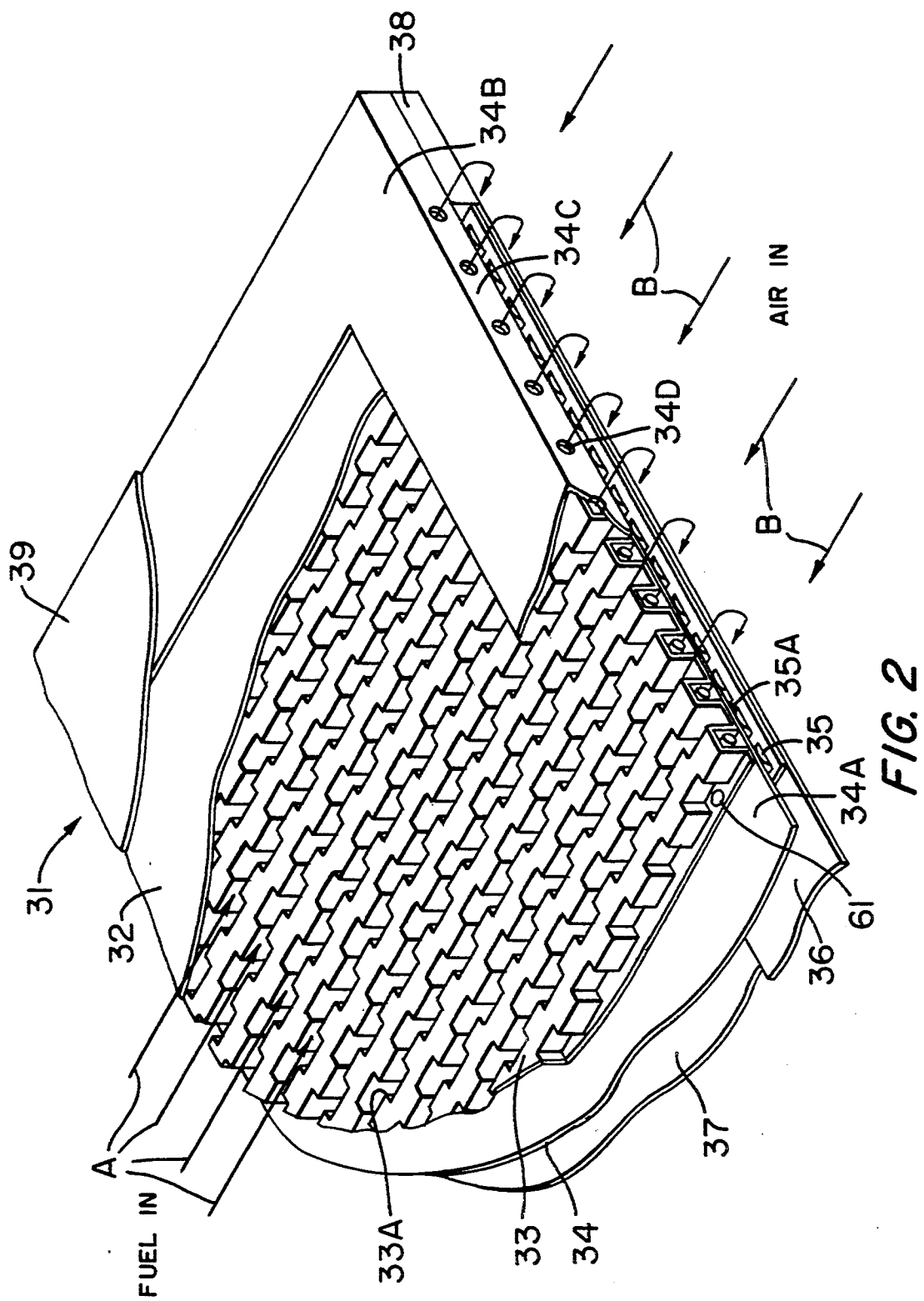
FIG. 2 illustrates in more detail the construction of a bipolar plate assembly used to fabricate the fuel cells utilized in the fuel cell system of FIG. 1.

FIG. 2 illustrates in greater detail the elements of a bipolar plate assembly 31 used to form the cells 2 of the fuel cell system 1 of FIG. 1. As shown, the assembly 31 comprises an anode 32 which overlies an anode current collector 33. The current collector 33 has staggered passages 33A which define the above-mentioned anode passages 4C and through which fuel gas passes in the direction A.

A bipolar plate 34 has a main section 34A which underlies the anode current collector 33. The periphery 34B of the bipolar plate 34 is turned upward and backward so as to form a border and wet seal with a carbonate matrix 39. This border extends around the sides of the anode 32 and the current collector 33, leaving open the portions of the sides which receive the fuel gas in the passages 33A.

A face 34C of the bipolar plate periphery 34B borders the exhaust gas end of the anode passages 33A and is provided with apertures 34D adjacent the respective passages. These apertures define the above-discussed restricted anode outlet ports 4D and couple the fuel exhaust gas from the anode passages into the cathode inlet manifold receiving the oxidant gas.

A cathode current collector 35 underlies the bipolar plate 34 and has passages 35A for carrying the mixed oxidant and fuel exhaust gases at the cathode inlet manifold through the assembly 31 in the direction B. The passages 35A thus define the above-discussed cathode passages 5C. A cathode support strip 36 provides support for the border of a cathode 37 which underlines the cathode current collector 35. A manifold seal 38 is situated at the lateral border of the cathode current collector 35 below the bipolar plate 34. A similar manifold seal is situated at the other lateral border of the cathode current collector, but is not shown in the drawing.

Figure 4:
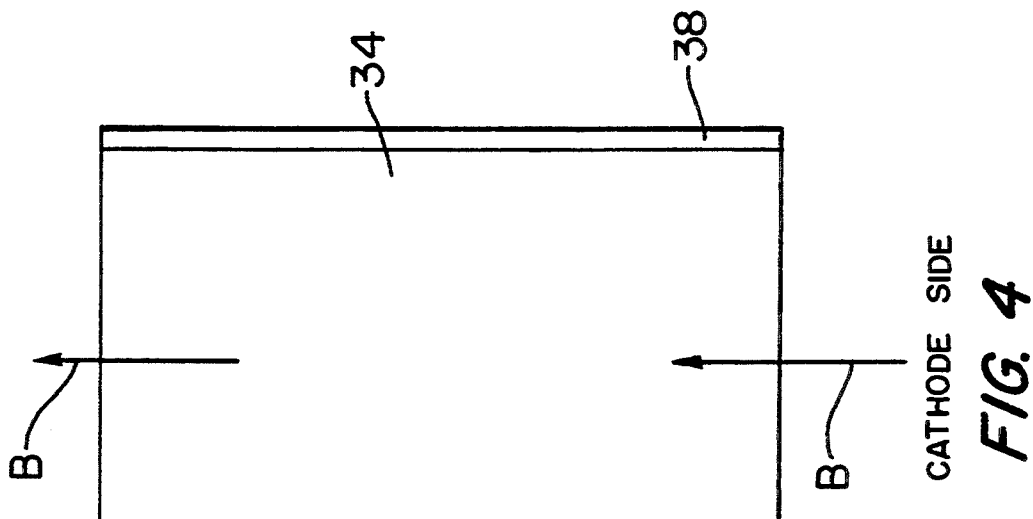
FIGS. 3 and 4 illustrate the anode and cathode sides of a bipolar plate used in the bipolar plate assembly of FIG. 2.
Figure 3:
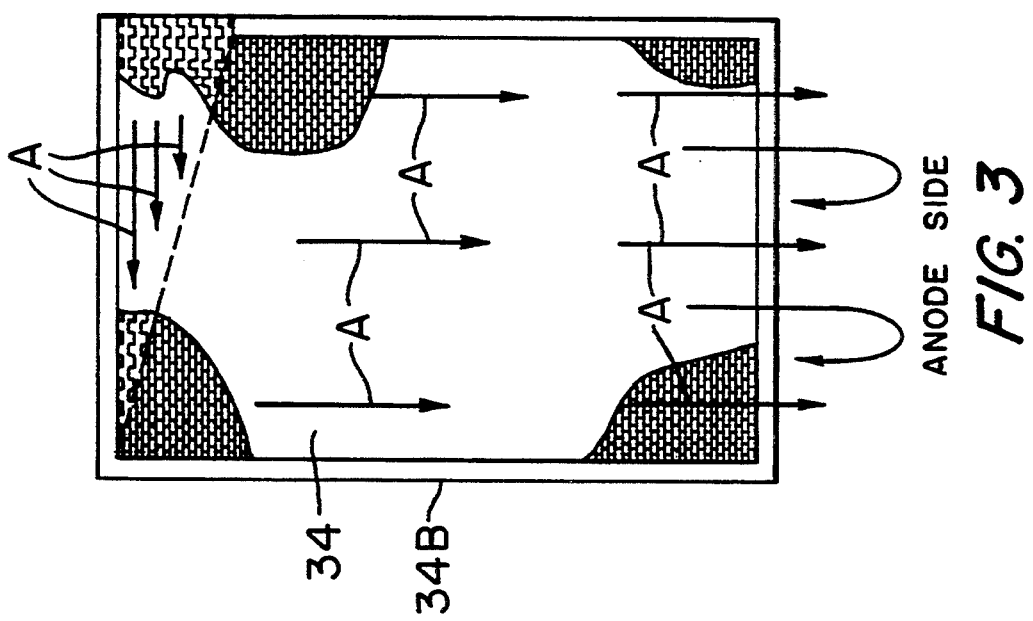

FIGS. 3 and 4 schematically illustrate anode and cathode sides of the bipolar plate 34 of the bipolar assembly 31. Also shown in this figure are the flow paths A and B for the fuel and oxidant gases.

In forming the fuel cells 2 of the stack 3, a plurality of bipolar plate assemblies 31 are stacked on each other with a carbonate electrolyte matrix 39 between successive plates. Each fuel cell 2 is thus actually defined by the upper and lower halves of two successively stacked bipolar plate assemblies 31 and the carbonate matrix 39 sandwiched therebetween.

As above-indicated, the fuel cells 2 of the stack 3 of the fuel cell system 1 are so arranged and configured that the fuel exhaust gas directly couples to the cathode inlet manifold, thereby causing the burning of the fuel exhaust gas in the fuel cell stack 3 itself. In order to promote burning of the fuel exhaust gas, it may be desirable to preheat the fresh oxidant gas in the cathode inlet manifold. In accordance with the invention, this is accomplished by a cathode recycle loop which carries a portion of the oxidant exhaust gas from the cathode outlet manifold 5D back into the cathode inlet manifold 5B.

This is schematically shown in FIG. 1, by the recycle loop 6 comprising the piping 6A and recycle blower 6B. As can be seen, the loop 6 carries a portion of the oxidant exhaust gas from the cathode outlet manifold 5D to the cathode inlet manifold 5B to preheat the mixed oxidant and fuel exhaust gases.

Also, as a further way of increasing or enhancing the burning of the anode exhaust gas when traversing the cathode compartment, the cathode passages 5C can be supplied with cathode material or a combustion catalyst. Additionally, such material can be placed at the inlets to and outlets from the cathode compartment. A particular material which can be used for the aforesaid purpose is nickel oxide (NiO).

While the invention has been describe above in terms of a system 1, fuel cells 2 and stack 3 arranged so that the oxidant gas and fuel gas travel in countercurrent relationship, the principles of the invention also apply to arrangements in which the gases travel in crosscurrent relationship. This is illustrated schematically in FIG. 5 by the fuel cell system 1' comprised of the fuel cell stack 3' whose fuel cells are arranged so that the fuel gas travels in the direction A' through the stack and so that the oxidant gas travels in the crosscurrent direction B' through the stack.

In this case, fuel gas is delivered by fuel gas inlet manifold 4B' to the stack. The fuel gas passes in the direction A' through the stack and the fuel exhaust gas is collected in an anode exhaust manifold 41 of the anode compartment. Piping 42 then couples or delivers a part of the anode exhaust gas to the cathode inlet manifold 5B' which contains no burner and which also receives oxidant gas from an oxidant supply. The mixture of oxidant gas and anode exhaust gas then passes through the cathode passages where burning of the anode exhaust gas occurs. Cathode exhaust gas exits the cathode compartment of the stack via the cathode outlet manifold 5D'.

Figure 5:
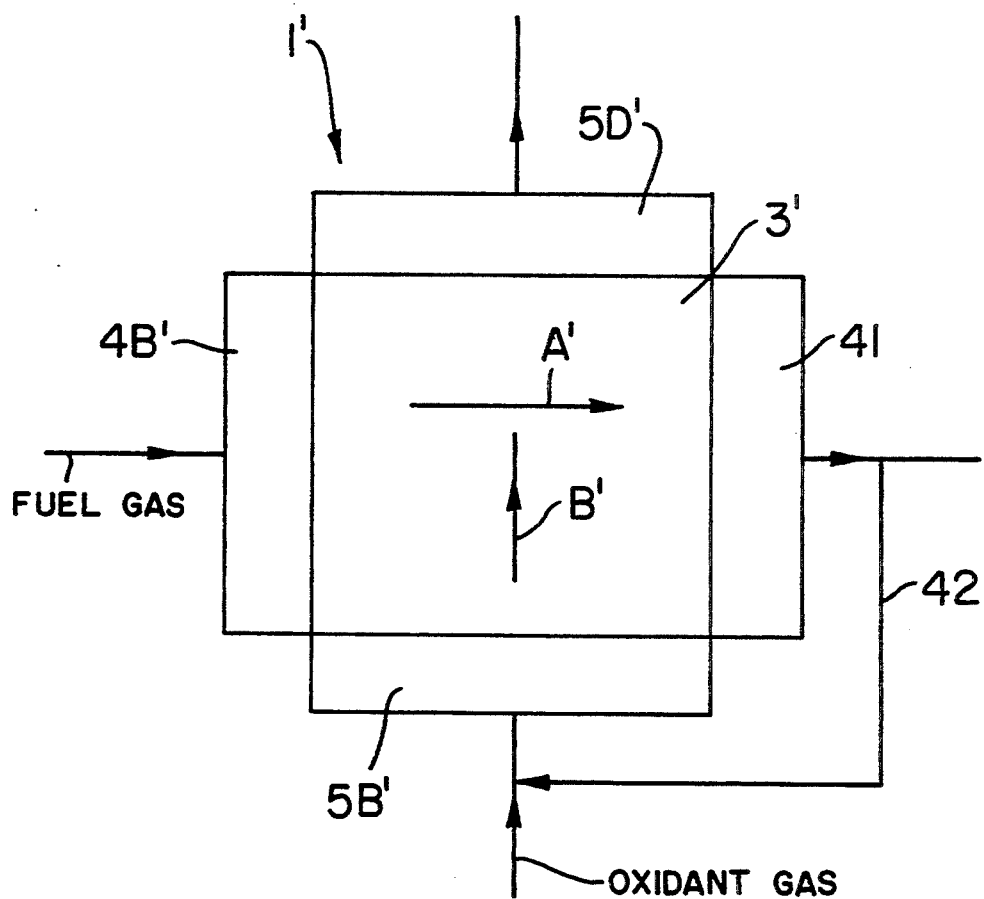
FIG. 5 illustrates a further fuel cell system in accordance with the principles of the present invention.

The system of FIG. 5 can also be modified to include a recycle loop for the cathode exhaust gas similar to the system of FIG. 1. Additionally, materials or catalysts promoting the burning reaction can be placed in the cathode passages also similar to the system of FIG. 1.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, instead of the anode outlet ports 4D being provided only at the cathode inlet manifold 5B, some anode outlet ports could also be provided directly into the cathode passages 5C. This is shown in FIG. 2 by the anode outlet port formed by an aperture 61 which passes through the anode current collector 33 and bipolar plate 34 so as to connect an anode passage 33A of the anode current collector 33 and a cathode passage 35A of the cathode current collector 35. Additional apertures 61 can be provided to further connect the passages 33A and 35A and, if desired, these apertures can be used with, or in place of, the apertures 34D in the bipolar plate face 34C.

What is claim is:

1. A fuel cell system comprising:
   a least one fuel cell comprising: a cathode compartment for receiving oxidant gas and carrying said oxidant gas through said fuel cell; and an anode compartment for receiving fuel gas and for carrying fuel gas through said fuel cell, said anode compartment being adapted to communicate fuel exhaust gas directly to said cathode compartment, whereby burning of said fuel exhaust gas and said oxidant gas to generate $CO_2$ occurs in said cathode compartment.

2. A fuel cell system in accordance with claim 1 wherein:
   said fuel cell system comprises a plurality of said fuel cells arranged one on top of the other to form a fuel cell stack.

3. A fuel cell system in accordance with claim 1 wherein:
   said anode compartment is adapted to uniformly communicate said fuel exhaust gas to said cathode compartment.

4. A fuel cell system in accordance with claim 1 further comprising:
   means for preheating the oxidant gas delivered to said cathode compartment.

5. A fuel cell system in accordance with claim 4 wherein:
   said preheating means includes: a recycle loop for recycling oxidant exhaust gas from said cathode compartment back into said cathode compartment.

6. A fuel cell system in accordance with claim 1 wherein:
   said cathode compartment includes a first means for receiving said oxidant gas and a second means for carrying said oxidant gas through said fuel cell;
   and said anode compartment is adapted to communicate directly with one of: said first means; said second means; and said first and second means.

7. A fuel cell system in accordance with claim 1 wherein:
   said cathode compartment carries said oxidant gas through said fuel cell in a direction countercurrent to the direction in which said anode compartment carries said fuel gas through said fuel cell.

8. A fuel cell system comprising:
   at least one fuel cell comprising: a cathode compartment including a cathode inlet manifold for receiving oxidant gas and cathode passages communicating with said cathode inlet manifold for carrying said oxidant gas through said fuel cell; and an anode compartment including anode passages for carrying fuel gas through said anode compartment, said fuel passages having anode outlet ports directly communicating with said cathode compartment to directly communicate fuel exhaust gas to said cathode compartment, whereby burning of said fuel exhaust gas and said oxidant gas to generate $CO_2$ occurs in said cathode compartment.

9. A fuel cell system in accordance with claim 8 wherein:
   said anode outlet ports directly communicate with one of: said cathode inlet manifold; said cathode passages; and said cathode inlet manifold and said cathode passages.

10. A fuel cell system in accordance with claim 9 wherein:
    said fuel cell system comprises a plurality of said fuel cells arranged one on top of the other to form a fuel cell stack.

11. A fuel cell system in accordance with claim 9 wherein:
    said cathode passages have cathode inlet ports and cathode outlet ports, said cathode inlet ports receiving oxidant gas from said cathode inlet manifold.

12. A fuel cell system in accordance with claim 11 wherein:
    said anode outlet ports are adjacent said cathode inlet ports.

13. A fuel cell system in accordance with claim 12 wherein:
    said anode outlet ports are uniformly distributed relative to said cathode inlet ports.

14. A fuel cell system in accordance with claim 12 wherein:
    said cathode passages carry said oxidant gas in a first direction through said cell;
    and said anode passages carry said fuel gas through said cell in a direction countercurrent to said first direction.

15. A fuel cell system in accordance with claim 11 wherein:
    said cathode compartment includes a cathode support strip at said cathode inlet and/or outlet ports to promote said burning of said fuel exhaust gas and said oxidant gas.

16. A fuel cell system in accordance with claim 11 further comprising:
    a recycle loop communicating with said cathode outlet ports and said cathode inlet manifold for carrying oxidant exhaust gas to said cathode inlet manifold.

17. A fuel cell system in accordance with claim 8 wherein:
    said cathode passages include means for promoting said burning of said fuel exhaust gas and said oxidant.

18. A fuel cell system in accordance with claim 17, wherein:
    said means for promoting said burning includes NiO material.

19. A fuel cell system comprising:
    a least one fuel cell comprising: a cathode compartment including a cathode inlet manifold for receiving oxidant gas and cathode passages communicating with said cathode inlet manifold for carrying said oxidant gas through said fuel cell, said cathode inlet manifold being exclusive of burner means for burning oxidant gas and fuel exhaust gas; and an anode compartment for carrying fuel gas through said cell;
    and conveying means communicating with said anode compartment for conveying fuel exhaust gas to said cathode inlet manifold, whereby burning of said fuel exhaust gas and said oxidant gas to generate $CO_2$ occurs in said cathode compartment.

20. A fuel cell system in accordance with claim 19 wherein:

said anode compartment includes an anode outlet manifold for receiving fuel exhaust gas;

and said conveying means communicates with said anode outlet manifold.

21. A fuel cell system in accordance with claim 19 wherein:

said cathode passages include material promoting said burning of said oxidant gas and said fuel exhaust gas.

22. A fuel cell system in accordance with claim 19 further comprising:

a recycle loop for communicating with said cathode passages for carrying oxidant exhaust gas to said cathode inlet manifold.

23. A method of operating a fuel cell system comprising:

providing one or more fuel cells arranged in a stack, each fuel cell having a cathode compartment for receiving oxidant gas and for carrying said oxidant gas through said fuel cell and an anode compartment for receiving fuel gas and carrying said fuel gas through said cell;

and arranging said cathode and anode compartments of one or more of said fuel cells so that fuel exhaust gas is directly communicated from said anode compartment to said cathode compartment, whereby burning of said fuel exhaust gas and said oxidant gas to generate $CO_2$ occurs in said cathode compartment.

24. A method of operating a fuel cell system in accordance with claim 23 wherein:

said direct communication of said fuel exhaust gas is carried out uniformly.

25. A method of operating a fuel cell system in accordance with claim 23 further comprising:

preheating said oxidant gas communicated to said cathode compartment.

26. A method of operating a fuel cell system in accordance with claim 25 wherein:

said preheating includes recycling oxidant exhaust gas from said cathode compartment back into said cathode compartment.

27. A method of operating a fuel cell system in accordance with claim 23 wherein:

said fuel exhaust gas is directly communicated to one of: a cathode inlet manifold of said cathode compartment; cathode passages of said cathode compartment; and said cathode inlet manifold and said cathode passages of said cathode compartment.

28. A method of operating a fuel cell system comprising:

providing one or more fuel cells arranged in a stack, each said fuel cell including a cathode compartment having a cathode inlet manifold for receiving oxidant gas and cathode passages for carrying said oxidant gas through said fuel cell, said cathode inlet manifold being exclusive of means for burning fuel exhaust gas and oxidant gas, and an anode compartment for receiving fuel gas and carrying said fuel gas through said cell;

and communicating fuel exhaust gas from said anode compartment to said cathode inlet manifold whereby burning of said fuel exhaust gas and said oxidant gas to generate $CO_2$ occurs in said cathode compartment.

* * * * *

UNITED STATES PATENT AND TRADEMARK OFFICE
CERTIFICATE OF CORRECTION

PATENT NO. : 5,422,195
DATED : June 6, 1995
INVENTOR(S) : Randolph M. Bernard

It is certified that error appears in the above-indentified patent and that said Letters Patent is hereby corrected as shown below:

Col. 4, line 30. Change "describe" to -- described --.

Col. 5, line 11. Change "claim" to -- claimed --.

Col. 5, line 13. Change "a" (first occurrence) to -- at --.

Col. 6, line 57. Change "a" (first occurrence) to -- at --

Col. 8, line 31. After "manifold" insert -- , --.

Signed and Sealed this

Fifth Day of September, 1995

Attest:

BRUCE LEHMAN

Attesting Officer     Commissioner of Patents and Trademarks